US012664457B2

(12) United States Patent
    Kawashita

(10) Patent No.: US 12,664,457 B2
(45) Date of Patent: Jun. 23, 2026

(54) INFORMATION PROCESSING DEVICE, METHOD, AND NON-TRANSITORY COMPUTER-READABLE RECORDING MEDIUM STORING PROGRAM

(71) Applicant: Fujitsu Limited, Kawasaki (JP)

(72) Inventor: Mitsuya Kawashita, Kawanishi (JP)

(73) Assignee: Fujitsu Limited, Kawasaki (JP)

( * ) Notice: Subject to any disclaimer, the term of this patent is extended or adjusted under 35 U.S.C. 154(b) by 16 days.

(21) Appl. No.: 19/047,117

(22) Filed: Feb. 6, 2025

(65) Prior Publication Data

US 2025/0181956 A1       Jun. 5, 2025

Related U.S. Application Data

(63) Continuation of application No. PCT/JP2022/032248, filed on Aug. 26, 2022.

(51) Int. Cl.
    *G06N 10/40*          (2022.01)
    *B82Y 10/00*          (2011.01)

(52) U.S. Cl.
    CPC .............. *G06N 10/40* (2022.01); *B82Y 10/00* (2013.01)

(58) Field of Classification Search
    CPC .......... G06N 10/40; G06N 5/01; G06N 10/00; B82Y 10/00
    See application file for complete search history.

(56) References Cited

U.S. PATENT DOCUMENTS

| | | | |
|---|---|---|---|
| 9,787,409 | B1 | 10/2017 | Ladd |
| 2016/0085616 | A1 | 3/2016 | Berkley |
| 2020/0403137 | A1 | 12/2020 | Lampert et al. |
| 2021/0350268 | A1 | 11/2021 | Whittaker et al. |

(Continued)

FOREIGN PATENT DOCUMENTS

| | | |
|---|---|---|
| JP | H08-509546 A | 10/1996 |
| JP | 2019-513249 A | 5/2019 |
| JP | 2022-536594 A | 8/2022 |

(Continued)

OTHER PUBLICATIONS

International Search Report dated Nov. 1, 2022, issued in counterpart International application No. PCT/JP2022/032248, with English translation. (10 pages).

(Continued)

*Primary Examiner* — Jung Kim
(74) *Attorney, Agent, or Firm* — WHDA, LLP

(57)          ABSTRACT

An information processing device includes: a plurality of qubits; a generator that generates a plurality of signals; a converter that converts the plurality of signals into a plurality of analog signals of which signal levels are regulated; a multiplexer that outputs a multiplexed signal obtained by multiplexing the plurality of analog signals; a divider that divides the multiplexed signal into a plurality of divided signals; a plurality of attenuators that attenuates the plurality of divided signals and provides the plurality of attenuated divided signals to each of the plurality of qubits; and a setter that sends setting signals that are common to the plurality of attenuators and indicate each of attenuation amounts of the plurality of attenuators, wherein the attenuation amounts are set in the plurality of attenuators, based on the setting signals.

17 Claims, 13 Drawing Sheets

(56)                    References Cited

U.S. PATENT DOCUMENTS

2021/0350270 A1    11/2021  Jones et al.
2025/0181956 A1*    6/2025  Kawashita ............... G06N 5/01

FOREIGN PATENT DOCUMENTS

WO           94/18576  A2    8/1994
WO         2017/139683  A1    8/2017
WO         2020/252157  A1    12/2020

OTHER PUBLICATIONS

J.-S. Park et al., "13.1 A Fully Integrated Cryo-CMOS SoC for Qubit Control in Quantum Computers Capable of State Manipulation, Readout and High-Speed Gate Pulsing of Spin Qubits in Intel 22nm FFL FinFET Technology", 2021. IEEE International Solid-State Circuits Conference (ISSCC), Mar. 3, 2021, pp. 208-210, Retrieved from the Internet: <URL: <https://ieeexplore.ieee.org/abstract/document/9365762>,> cited in ISR dated Nov. 1, 2022. (3 pages).
Extended Supplementary European Search Report dated Sep. 4, 2025, issued in counterpart Application No. 22956543.7. (4 pages).
Fabio Sebastiano et al., "Cryo-CMOS Electronic Control for Scalable Quantum Computing", Proceedings of the 54th Annual Design Automation Conference 2017, Jun. 18, 2017, pp. 1-6, Cited in Extended Supplementary European Search Report dated Sep. 4, 2025. (6 pages).

* cited by examiner

FIG. 3

CONTENTS OF DB

| ATT SETTING VALUE | NUMBER GIVEN TO Qubit | | | | | |
|---|---|---|---|---|---|---|
| | 1 | 2 | 3 | 4 | ... | n |
| 1 | 0 | 0 | 0 | 0 | | 0 |
| 2 | 0 | 0 | 0 | 0 | | 0 |
| 3 | 0 | 0 | 0 | 0 | | 0 |
| 4 | 0 | 1 | 1 | 1 | | 0 |
| ⋮ | | | | | | |
| i | 0 | 0 | 0 | 0 | | 0 |

LEGEND

1: EXPECTED VALUE IS RETURNED

0: NO EXPECTED VALUE IS RETURNED

USAGE METHOD

SETTING VALUE WITH WHICH EXPECTED VALUES ARE RETURNED FROM MOST QUBITS IS ADOPTED

*IF SAME, CENTRAL VALUE IS USED

CONTENTS OF DB

| ATT SETTING VALUE | NUMBER GIVEN TO Qubit | | | | | |
|---|---|---|---|---|---|---|
| | 1 | 2 | 3 | 4 | ... | n |
| 1 | 0 | 0 | 0 | 0 | | 0 |
| 2 | 0 | 0 | 0 | 0 | | 0 |
| 3 | 0 | 0 | 0 | 0 | | 0 |
| 4 | 0 | 1 | 1 | 1 | | 0 |
| ⋮ | | | | | | |
| i | 0 | 0 | 0 | 0 | | 0 |

LEGEND

1: EXPECTED VALUE IS RETURNED

0: NO EXPECTED VALUE IS RETURNED

USAGE METHOD

CENTRAL SETTING VALUE IN ADJUSTMENT RANGE IN WHICH EXPECTED VALUES ARE RETURNED IS ADOPTED

NUMBER OF Qubits FROM WHICH EXPECTED VALUES ARE RETURNED

SETTING VALUE

CONTENTS OF DB

| ATT SETTING VALUE | NUMBER GIVEN TO Qubit | | | | | |
|---|---|---|---|---|---|---|
| | 1 | 2 | 3 | 4 | ... | n |
| 1 | 0 | 0 | 0 | 0 | | 0 |
| 2 | 0 | 0 | 0 | 0 | | 0 |
| 3 | 0 | 0 | 0 | 0 | | 0 |
| 4 | 0 | 1 | 1 | 1 | | 0 |
| ⋮ | | | | | | |
| i | 0 | 0 | 0 | 0 | | 0 |

LEGEND

1: EXPECTED VALUE IS RETURNED

0: NO EXPECTED VALUE IS RETURNED

USAGE METHOD

MAXIMUM SETTING VALUE IN ADJUSTMENT RANGE IN WHICH EXPECTED VALUES ARE RETURNED IS ADOPTED

NUMBER OF Qubits FROM WHICH EXPECTED VALUES ARE RETURNED

SETTING VALUE

INFORMATION PROCESSING DEVICE, METHOD, AND NON-TRANSITORY COMPUTER-READABLE RECORDING MEDIUM STORING PROGRAM

CROSS-REFERENCE TO RELATED APPLICATION

This application is a continuation application of International Application PCT/JP2022/032248 filed on Aug. 26, 2022 and designated the U.S., the entire contents of which are incorporated herein by reference.

FIELD

The present disclosure relates to an information processing device, a method, and a non-transitory computer-readable recording medium storing a program.

BACKGROUND

Conventionally, a quantum computer system that supplies a multiplexed analog control signal to a quantum processor in a cryostat via a demultiplexer in the cryostat is known. The quantum processor includes a plurality of qubits (see, for example, Patent Document 1).

Examples of the related art include: [Patent Document 1]U.S. Patent Application Publication No. 2021/0350270.

SUMMARY

According to an aspect of the embodiments, there is provided an information processing device including: a plurality of qubits; a generator configured to generate a plurality of signals; a converter configured to convert the plurality of signals into a plurality of analog signals of which signal levels are regulated; a multiplexer configured to output a multiplexed signal obtained by multiplexing the plurality of analog signals; a divider configured to divide the multiplexed signal into a plurality of divided signals; a plurality of attenuators configured to attenuate the plurality of divided signals and provides the plurality of attenuated divided signals to each of the plurality of qubits; and a setter configured to send setting signals that are common to the plurality of attenuators and indicate each of attenuation amounts of the plurality of attenuators, wherein the attenuation amounts are set in the plurality of attenuators, based on the setting signals.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an exemplary configuration of an information processing device according to a second embodiment.

DESCRIPTION OF EMBODIMENTS

An attenuator that attenuates a signal supplied to the qubits may be sometimes provided. However, as the number of qubits becomes greater, the number of attenuators also becomes greater, such that the number of setting signals sent for the purpose of setting the attenuation amounts of the attenuators increases. When the number of setting signals increases, for example, the number of lines transmitting the setting signals increases, and it may be likely to be difficult to secure an arrangement space for the lines transmitting the setting signals.

The present disclosure provides an information processing device, a method, and a program capable of reducing the number of setting signals for attenuators.

Hereinafter, embodiments will be described.

Figure 1:
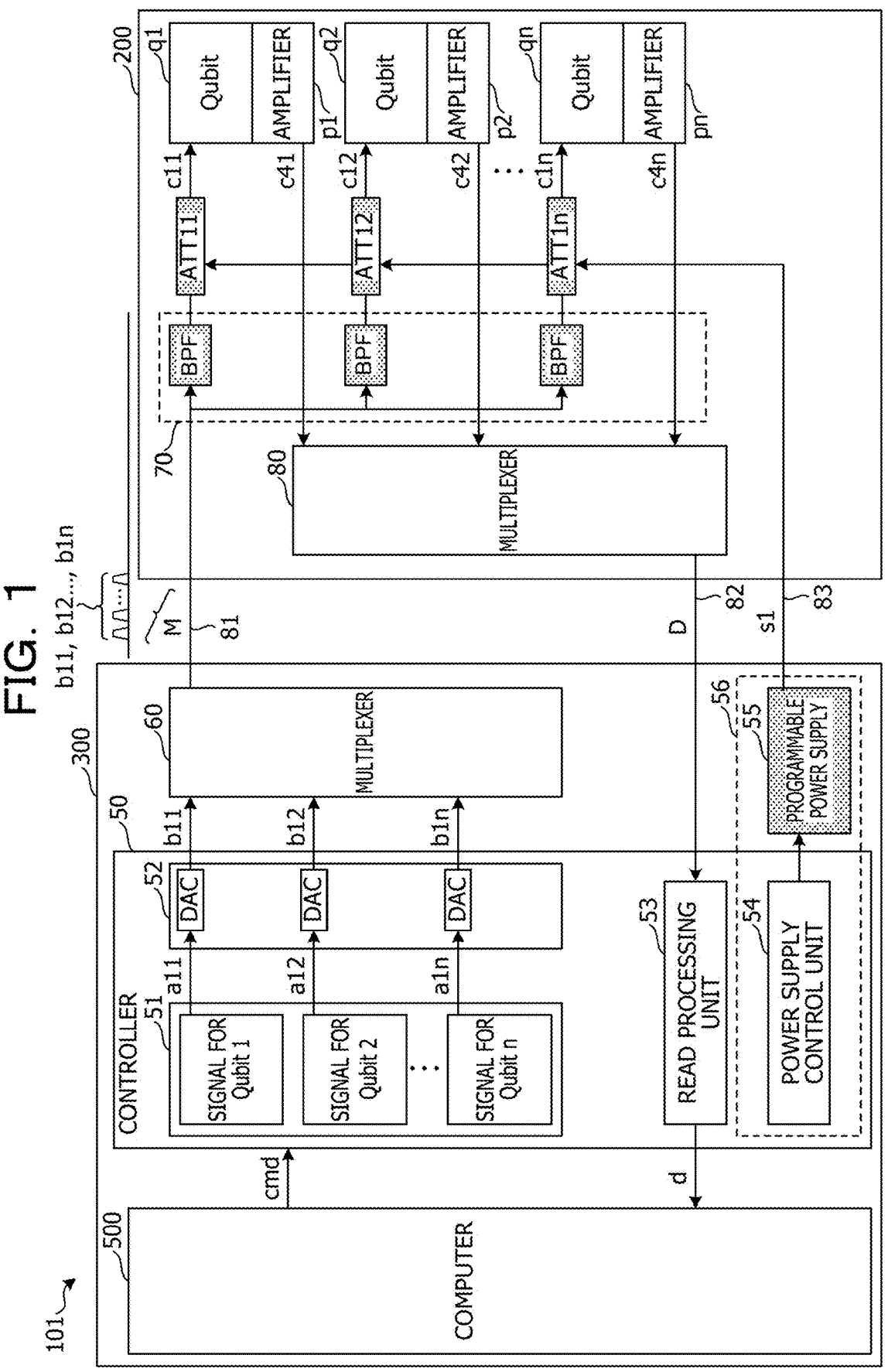
FIG. 1 is a diagram illustrating an exemplary configuration of an information processing device according to a first embodiment.

FIG. 1 is a diagram illustrating an exemplary configuration of an information processing device according to a first embodiment. The information processing device 101 illustrated in FIG. 1 processes information, using a plurality of quantum bits (qubits), and outputs a processing result of the processing to the outside. The information processing device 101 is used as a quantum computer or a quantum computing system.

FIG. 1 depicts a plurality of qubits q (n qubits q1, q2, . . . , and qn). Here, n denotes an integer equal to or greater than two. Each of the plurality of qubits q carries information on a quantum mechanical two-state system. The qubit q is, for example, a superconducting qubit formed by a superconducting circuit including a superconducting Josephson junction. The type of the qubit may not be limited to this.

The information processing device 101 includes a cooler 200 and a control device 300.

The cooler 200 cools the plurality of qubits q. The cooler 200 is, for example, a dilution refrigerator that uses heat of dilution generated when liquid helium 3 is diluted into liquid helium 4. The cooler 200 may be a device that cools the qubits by another cooling approach. The cooler 200 includes the plurality of qubits q (n qubits q1, q2, . . . , and qn), a plurality of amplifiers p (n amplifiers p1, p2, . . . , and pn), a divider 70, a plurality of attenuators ATT (n ATTs 11, 12, . . . , and 1n), and a multiplexer 80.

The control device 300 controls the plurality of qubits q in the cooler 200, processes information, based on data read from these qubits q, and outputs a processing result of the processing to the outside. The control device 300 includes a computer 500, a controller 50, a multiplexer 60, and a programmable power supply 55.

The computer 500 is a host computer for controlling the plurality of qubits q. The computer 500 generates a command cmd for controlling the plurality of qubits q to send the generated command cmd to the controller 50 and receives data d representing read results from the plurality of qubits q, from the controller 50. The computer 500 processes the data d and outputs a processing result of the processing to an external device such as a display. The computer 500 is coupled to the controller 50 in a wired or wireless manner.

The controller 50 generates a plurality of signals for the plurality of qubits q in accordance with the command cmd input from the computer 500 to output the generated signals to a line 81 and acquires the read results from the plurality of qubits q via a line 82. The controller 50 outputs the data d representing the read results from the plurality of qubits q acquired via the line 82 to the computer 500.

The controller 50 includes a generator 51, a converter 52, a read processing unit 53, and a power supply control unit 54. Some or all of the generator 51, the converter 52, the read processing unit 53, the power supply control unit 54, the multiplexer 60, and the programmable power supply 55 are formed by a field programmable gate array (FPGA), an application specific integrated circuit (ASIC), a microcomputer, or the like, for example.

The generator 51 is a circuit that generates a plurality of control signals a1 (n control signals a11, a12, . . . , and a1n) for use for the plurality of qubits q. The control signal a11 is a signal for the qubit q1. The control signal a12 is a signal for the qubit q2. The control signal a1n is a signal for a qubit qn. The generator 51 generates the plurality of control signals a1 corresponding to content of the command cmd supplied from the computer 500 in accordance with the command cmd, for example. The plurality of control signals a1 is digital signals used to control the states of the plurality of qubits q. Each of the n control signals a11, a12, . . . , and a1n is a signal for controlling the state of the corresponding qubit among the plurality of qubits q.

The converter 52 is a circuit that converts the plurality of control signals a1 generated by the generator 51 into a plurality of analog signals b1 (n analog signals b11, b12, . . . , and b1n) of which signal levels are regulated. The analog signal b11 is a signal for the qubit q1. The analog signal b12 is a signal for the qubit q2. The analog signal b1n is a signal for the qubit qn. The plurality of analog signals b1 is, for example, electromagnetic wave signals (as a specific example, microwave signals) transmitted to the plurality of qubits q.

For example, the converter 52 adjusts the signal level of at least one of the plurality of analog signals b1 with a digital-analog converter (DAC) and regulates the signal levels of the plurality of analog signals b1 to substantially the same level value.

The converter 52 converts the plurality of control signals a1 into the plurality of analog signals b1 having a frequency higher than the frequency used in the generator 51 (used frequency $f_0$). For example, the converter 52 adjusts the frequencies of the plurality of analog signals b1 to predetermined frequencies F1 (for example, resonance frequencies of the plurality of qubits q).

The frequencies of the plurality of analog signals b1 may be the same as or different from each other. For example, in a case where the resonance frequencies of the plurality of qubits q are the same as each other, the frequencies of the plurality of analog signals b1 can be the same as each other, but in a case where the resonance frequencies of the plurality of qubits q are different from each other, the frequencies of the plurality of analog signals b1 can be different from each other. For example, the converter 52 adjusts each of the frequencies of the plurality of analog signals b1 to a resonance frequency of a corresponding qubit among the plurality of qubits q.

The converter 52 may have a function of adjusting such that an integral multiple of the used frequency $f_0$ (frequency of harmonics) differs from the predetermined frequency F. This ensures that harmonics having a frequency obtained by multiplying the used frequency $f_0$ do not appear at the frequencies (predetermined frequencies F) of the analog signals b1 and thus, may mitigate malfunctions of the cooler 200 (in particular, the qubits p) due to noise of the harmonics.

The multiplexer 60 is a circuit that multiplexes the plurality of analog signals b1 and outputs a multiplexed signal M obtained by multiplexing the plurality of analog signals b1. The multiplexer is also referred to as a combiner. The multiplexed signal M is transmitted to the divider 70 of the cooler 200 from the multiplexer 60 of the control device 300 via the line 81 (for example, a transmission line such as a coaxial cable). Since the plurality of analog signals b1 is multiplexed and transmitted as the multiplexed signal M, the number of lines 81 and its arrangement space may be reduced as compared with a form in which the plurality of analog signals b1 are separately transmitted without being multiplexed. Such multiplexing is particularly advantageous in a case where the number of qubits q or analog signals b1 is enormous, such as several hundred or several thousand. The number of lines 81 can be one, but a plurality of lines 81 may be employed by dividing signals to be multiplexed into a plurality of sets.

Examples of a multiplexing approach performed by the multiplexer 60 include frequency-division multiplexing and time-division multiplexing.

The divider 70 divides the multiplexed signal M into a plurality of divided signals c1 (n divided signals c11, c12, . . . , and c1n) corresponding to the plurality of control signals a1. The divider is also referred to as a splitter or a demultiplexer. FIG. 1 depicts the divided signal c11 corresponding to the control signal a11, the divided signal c12 corresponding to the control signal a12, and the divided signal c1n corresponding to the control signal a1n. For example, the divider 70 divides the multiplexed signal M into the plurality of divided signals c1 with band pass filters (BPFs).

The plurality of attenuators ATT attenuates the plurality of divided signals e1 for use for the plurality of qubits q and provides the plurality of attenuated divided signals c1 to each of the plurality of qubits q. The ATT 11 attenuates the signal level of the corresponding divided signal c11 among the plurality of divided signals c1 to a level value used to control the state of the qubit q1. By supplying the attenuated divided signal c11 to the qubit q1 from the ATT 11, the resonance state of the qubit q1 becomes controllable. The ATT 12 attenuates the signal level of the corresponding divided signal c12 among the plurality of divided signals c1 to a level value used to control the state of the qubit q2. By supplying the attenuated divided signal c12 to the qubit q2 from the ATT 12, the resonance state of the qubit q2 becomes controllable. The ATT in attenuates the signal level of the corresponding divided signal c1$n$ among the plurality of divided signals c1 to a level value used to control the state of the qubit qn. By supplying the attenuated divided signal c1$n$ to the qubit qn from the ATT in, the resonance state of the qubit qn becomes controllable.

The quantum computer may sometimes supply weak power of −100 dBm or less to the qubits q to perform control. However, in a digital circuit that generates a digital signal, such as the generator 51, there is large noise such as digital noise. Therefore, by making the signal component of the analog signal b1 greater and then attenuating the whole signal, using the attenuator ATT, a signal-to-noise ratio (SN ratio) can be secured.

The plurality of amplifiers p amplifies a plurality of read signals representing read results for the states of the plurality of qubits q and outputs the amplified plurality of read signals c4 (n read signals c41, c42, . . . , and c4$n$). FIG. 1 depicts the read signal c41 representing a read result for the state of the qubit q1, the read signal c42 representing a read result for the state of the qubit q2, and the read signal c4$n$ representing a read result for the state of the qubit qn.

The multiplexer 80 is a circuit that multiplexes the plurality of analog read signals c4 and outputs a multiplexed signal D obtained by multiplexing the plurality of read signals c4. The multiplexed signal D is transmitted to the read processing unit 53 of the control device 300 from the multiplexer 80 of the cooler 200 via the line 82 (for example, a transmission line such as a coaxial cable). Since the plurality of read signals c4 is multiplexed and transmitted as the multiplexed signal D, the number of lines 82 and its arrangement space may be reduced as compared with a form in which the plurality of read signals c4 is separately transmitted without being multiplexed. Such multiplexing is particularly advantageous in a case where the number of qubits q or read signals c4 is enormous, such as several hundred or several thousand. The number of lines 82 can be one, but a plurality of lines 82 may be employed by dividing signals to be multiplexed into a plurality of sets.

Examples of a multiplexing approach performed by the multiplexer 80 include frequency-division multiplexing and time-division multiplexing.

The read processing unit 53 extracts the plurality of read signals c4 from the multiplexed signal D and converts the plurality of read signals c4 into the data d. The read processing unit 53 outputs the data d representing read results from the plurality of qubits q to the computer 500.

The control device 300 includes a setter 56 that sends common setting signals s1 to the plurality of attenuators ATT for the purpose of setting each attenuation amount of the plurality of attenuators ATT. In this example, the setter 56 includes the power supply control unit 54 and the programmable power supply 55. The power supply control unit 54 controls the programmable power supply 55 such that the common setting signals s1 are sent to the plurality of attenuators ATT. The common setting signals s1 indicate each attenuation amount of the plurality of attenuators ATT. The attenuation amounts are set in the plurality of attenuators ATT, based on the setting signals s1.

The setting signals s1 are commonly transmitted to the plurality of attenuators ATT from the setter 56 via the line 83. In a case where the setting signal s1 has a variable direct current (DC) voltage value, the line 83 can be a DC cable. The plurality of attenuators ATT attenuates the plurality of divided signals e1 by an attenuation amount according to a setting value set by the setting signals s1. That is, each of the n ATTs 11, 12, . . . , and in attenuates the corresponding divided signal among the plurality of divided signals c1 by the same attenuation amount according to the setting value set by the setting signals s1.

In the first embodiment, the respective signal levels of the plurality of analog signals b1 (n analog signals b11, b12, . . . , and b1$n$) are regulated to substantially the same level value by the converter 52. This ensures that the respective signal levels of the plurality of divided signals c1 (n divided signals c11, c12, . . . , and c1$n$) before being input to the plurality of attenuators ATT are also regulated to substantially the same level value. Therefore, by using the common setting signals s1 to set each of attenuation amounts of the plurality of attenuators ATT (n ATTs 11, 12, . . . , and in), the signal level of each of the plurality of divided signals c1 attenuates to the same level value used to control the states of the plurality of qubits q.

In this manner, in a case where each of the signal levels of the plurality of divided signals e1 is attenuated to the level value used to control the states of the plurality of qubits q, the common setting signals s1 become usable by regulating the respective signal levels of the plurality of analog signals b1. Accordingly, the number of setting signals for setting each attenuation amount of the plurality of attenuators ATT may be reduced to at least one, which may in turn allow the number of lines 83 transmitting the setting signals s1 and its arrangement space to be reduced.

Figure 2:
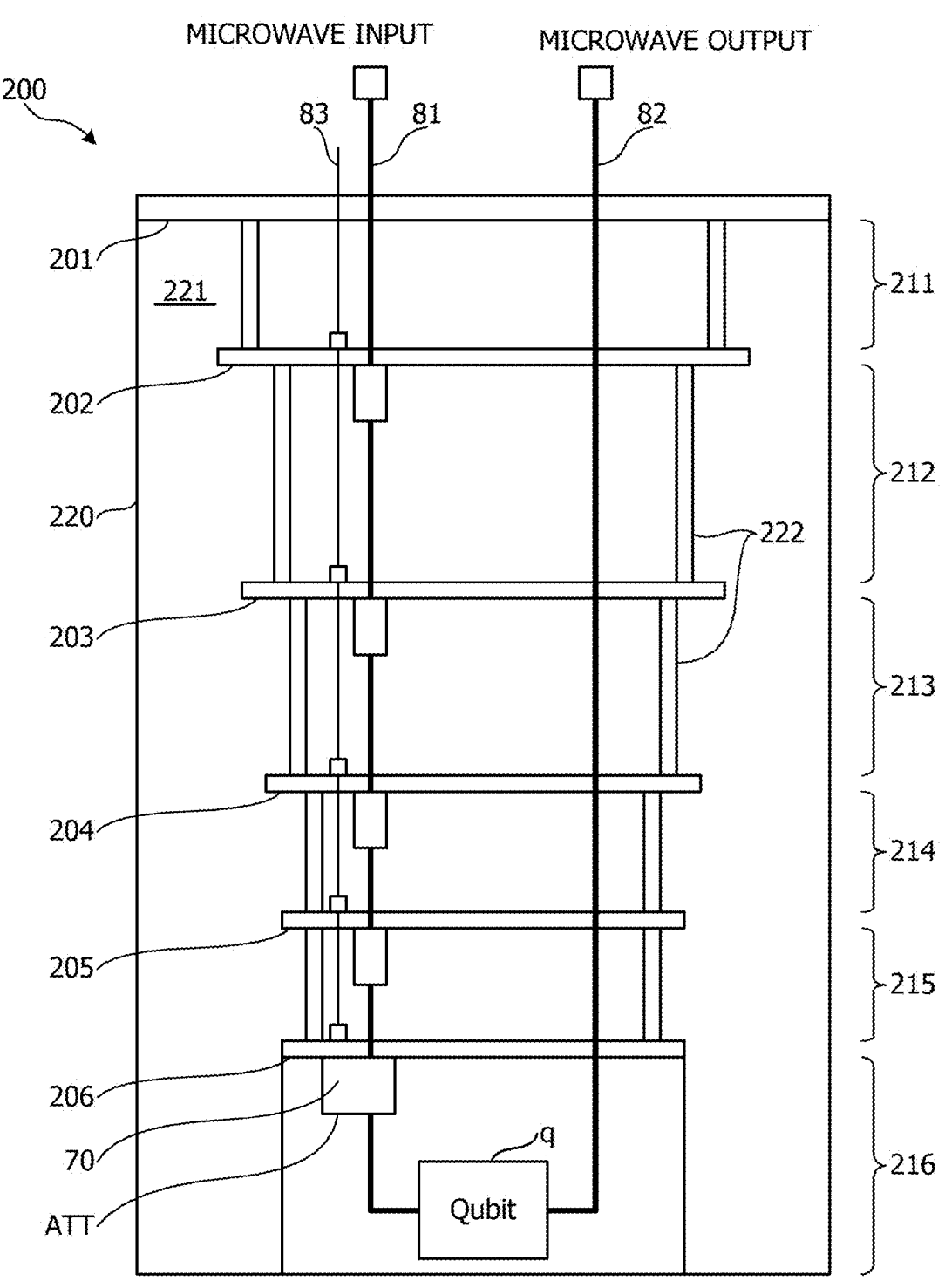
FIG. 2 is a diagram illustrating an exemplary internal configuration of a cooler.

FIG. 2 is a diagram illustrating an exemplary internal configuration of the cooler. The cooler 200 includes a chamber 221 isolated from the surrounding environment by a boundary surface 201 and an outer wall 220. The chamber 221 includes a plurality of plates 202 to 206 spaced at predetermined intervals from the boundary surface 201, and a plurality of support posts 222 supporting the plurality of plates 202 to 206 at predetermined intervals from the boundary surface 201. The plurality of plates 202 to 206 partitions the chamber 221 into a plurality of rooms 211 to 216 such that an internal temperature of the chamber 221 at each location of the plurality of plates 202 to 206 steadily lowers as away from the boundary surface 201. That is, the cooler 200 includes the plurality of rooms 211 to 216 placed in line such that the temperature gradually decreases as away from the boundary surface 201.

Among the plurality of rooms 211 to 216, the lowest temperature room 216 accommodates the plurality of qubits q, the plurality of ATTs, and the divider 70. The lines 81, 82, and 83 are coupled to the boundary surface 201 and pass through the boundary surface 201. Each of the lines 81, 82, and 83 may be a combination of a plurality of lines coupled via a connector between adjacent rooms.

The line 81 sequentially extends from the highest temperature room 211 to the lowest temperature room 216 among the plurality of rooms 211 to 216 and transmits the multiplexed signal M to the divider 70. The line 83 sequentially extends from the highest temperature room 211 to the lowest temperature room 216 among the plurality of rooms 211 to 216 and transmits the setting signals s1 to the plurality of ATTs.

If the divider 70 is arranged in any one of the rooms 211 to 215, the plurality of signal lines coupling between the divider 70 and the plurality of qubits q has to be relatively long, and thus, it becomes difficult to secure an arrangement space for this plurality of signal lines and downsize the cooler 200. On the other hand, in the form illustrated in FIG. 2, since the line 81 extends to the divider 70 arranged in the same room 216 as the plurality of qubits q, the lengths of the plurality of signal lines coupling between the divider 70 and the plurality of qubits q are reduced. This may facilitate securing an arrangement space for this plurality of signal lines and downsizing the cooler 200. This action effect similarly applies also to a second embodiment to be described later.

Figure 3:
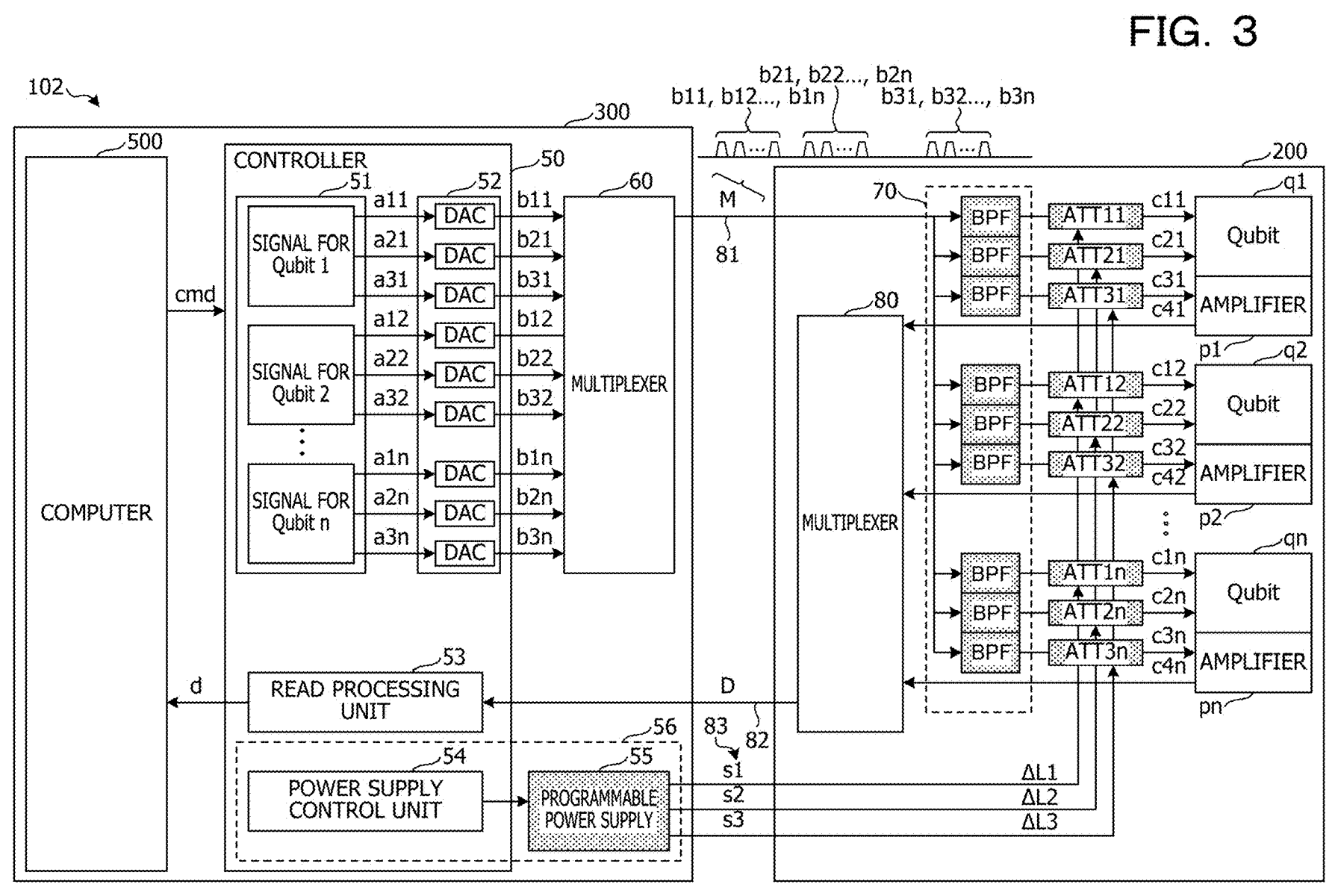

FIG. 3 is a diagram illustrating an exemplary configuration of an information processing device according to the second embodiment. In the second embodiment, description of configurations, actions, and effects similar to those in the first embodiment will be omitted or simplified by referring to the description above. An information processing device 102 of the second embodiment is different from the information processing device 101 of the first embodiment in that a generator 51 multiplexes a plurality of types of signals, a converter 52 converts the plurality of types of signals into a plurality of analog signals of which signal levels are regulated, and a setter 56 sends setting signals common to a plurality of ATTs for each type of signals.

The generator 51 generates a plurality of types of signals for use for a plurality of qubits q. In this example, the generator 51 generates n control signals a11, a12, . . . , and a1$n$, n read-aiding signals a21, a22, . . . , and a2$n$, and n pump signals a31, a32, . . . , and a3$n$. The control signals a11, a12, . . . , and a1$n$ can be similar to those in the first embodiment.

The read-aiding signal a21 is a signal for the qubit q1. The read-aiding signal a22 is a signal for the qubit q2. The read-aiding signal a2$n$ is a signal for the qubits qn. The generator 51 generates a plurality of read-aiding signals a2 (n read-aiding signals a21, a22, . . . , and a2$n$) corresponding to content of a command cmd supplied from a computer 500 in accordance with the command cmd, for example. The plurality of read-aiding signals a2 are digital signals used to read the states of the plurality of qubits q. Each of the n read-aiding signals a21, a22, . . . , and a2$n$ is a signal for reading the state of the corresponding qubit among the plurality of qubits q.

The pump signal a31 is a signal for the qubit q1. The pump signal a32 is a signal for the qubit q2. The pump signal a3$n$ is a signal for the qubit qn. The generator 51 generates a plurality of pump signals a3 (n pump signals a31, a32, . . . , and a3$n$) corresponding to content of the command cmd supplied from the computer 500 in accordance with the command cmd, for example. The plurality of pump signals a3 is digital signals used for a plurality of amplifiers p that parametrically amplifies a plurality of read signals c4 representing read results for the states of the plurality of qubits q. Each of the n pump signals a31, a32, . . . , and a3$n$ is a signal for controlling parametric amplification of the corresponding amplifier among the plurality of amplifiers p.

Similarly to the first embodiment, the converter 52 converts a plurality of control signals a1 into a plurality of analog signals b1 (n analog signals b11, b12, . . . , and b1$n$) of which signal levels are regulated.

The converter 52 converts the plurality of read-aiding signals a2 into the plurality of analog signals b2 (n analog signals b21, b22, . . . , and b2$n$) of which signal levels are regulated. The analog signal b21 is a signal for the qubit q1. The analog signal b22 is a signal for the qubit q2. The analog signal b2$n$ is a signal for the qubit qn. The plurality of analog signals b2 is, for example, electromagnetic wave signals (as a specific example, microwave signals) transmitted to the plurality of qubits q.

The converter 52 converts the plurality of pump signals a3 into a plurality of analog signals b3 (n analog signals b31, b32, . . . , and b3$n$) of which signal levels are regulated. The analog signal b31 is a signal for the qubit q1. The analog signal b32 is a signal for the qubit q2. The analog signal b3$n$ is a signal for the qubits qn. The plurality of analog signals b3 is, for example, electromagnetic wave signals (as a specific example, microwave signals) transmitted to the plurality of qubits q.

Figure 4:
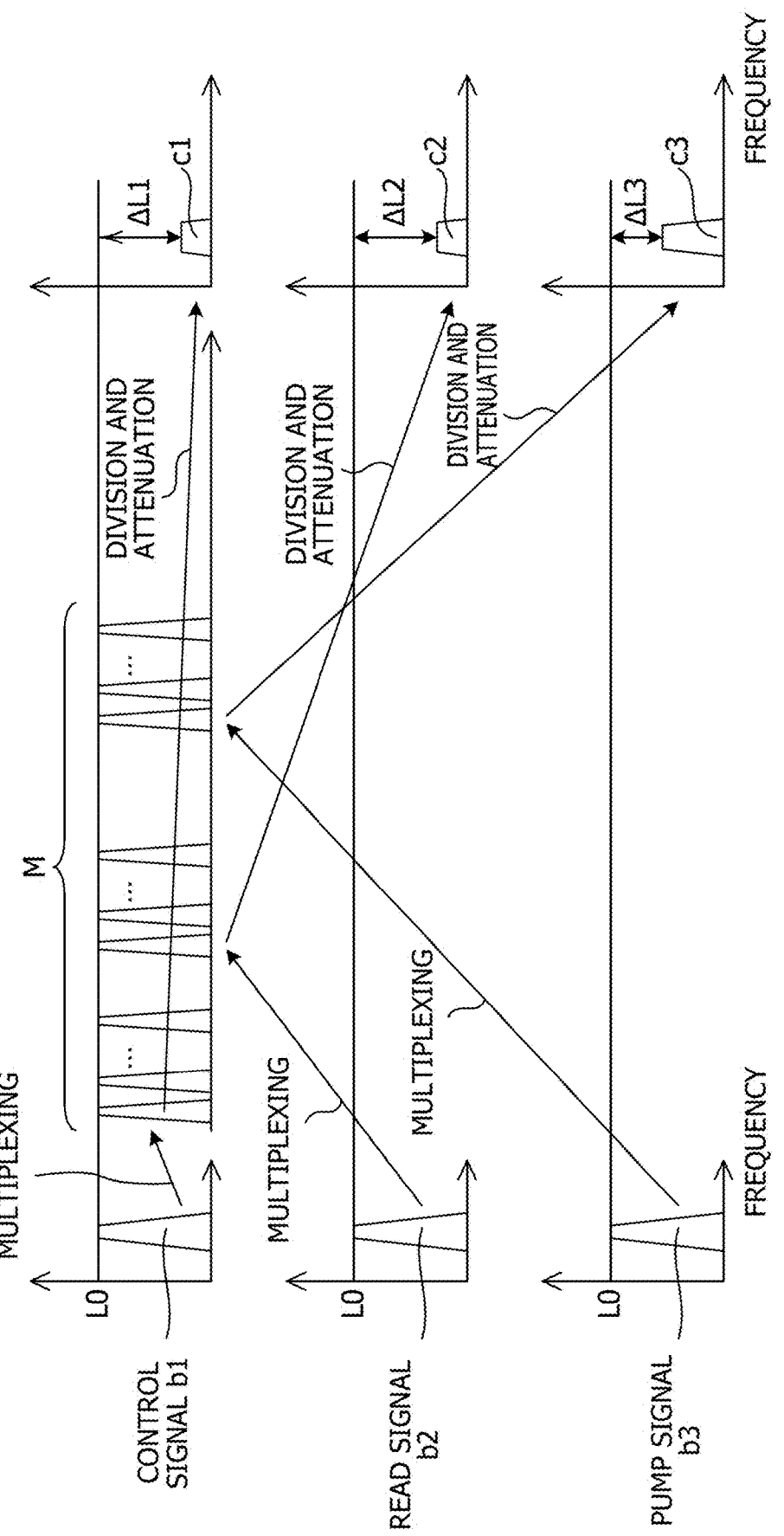
FIG. 4 is a diagram for explaining multiplexing of a plurality of types of signals and attenuation for each class of signals.

For example, the converter 52 adjusts the signal level of at least one of the plurality of analog signals b1, b2, and b3 with a digital-analog converter (DAC) and regulates the signal levels of the plurality of analog signals b1, b2, and b3 to substantially a same level value L0 (see FIG. 4).

FIG. 4 is a diagram for explaining multiplexing of a plurality of types of signals and attenuation for each class of signals. When a plurality of types of analog signals having different signal levels are multiplexed as they are, a signal of a type having a low signal level is affected by noise, and thus, the SN ratio of the signal after being divided by the divider may be likely to decrease. Since the signal levels of the plurality of analog signals b1, b2, and b3 are regulated to substantially the same level value L0, such a decrease in the SN ratio is suppressed.

In FIG. 3, the converter 52 converts the plurality of control signals a1 into the plurality of analog signals b1 having a frequency higher than the frequency used in the generator 51 (used frequency $f_0$). Similarly, the converter 52 converts the plurality of read-aiding signals a2 into the plurality of analog signals b2 having a frequency higher than the used frequency $f_0$ and converts the plurality of pump signals a3 into the plurality of analog signals b3 having a frequency higher than the used frequency $f_0$.

The converter 52 adjusts the frequencies of the plurality of analog signals b1 to a predetermined frequency F1 used to control the states of the plurality of qubits q. The converter 52 adjusts the frequencies of the plurality of analog signals b2 to a predetermined frequency F2 used to read the states of the plurality of qubits q. The converter 52 adjusts the frequencies of the plurality of analog signals b3 to a predetermined frequency F3 used for amplification control for the plurality of amplifiers p.

The frequencies F1, F2, and F3 are different from each other. For example, the frequency F1 is a frequency in a frequency band of 5 GHz or more but 7 GHz or less, the frequency F2 is a frequency in a frequency band of 8 GHz or more but 10 GHz or less, and the frequency F3 is a frequency in a frequency band of 16 GHz or more but 20 GHz or less.

The multiplexer 60 is a circuit that multiplexes the plurality of analog signals b1, b2, and b3 regardless of the classes of signals and outputs a multiplexed signal M obtained by multiplexing the plurality of analog signals b1, b2, and b3 by frequency-division multiplexing or the like.

A cooler 200 includes the plurality of qubits q (n qubits q1, q2, . . . , and qn), a plurality of amplifiers p (n amplifiers p1, p2, . . . , and pn), a divider 70, a plurality of attenuators ATT ($3 \times n$ ATTs 11, 12, . . . , in, 21, 22, . . . , 2$n$, 31, 32, . . . , and 3$n$), and a multiplexer 80.

The divider 70 divides the multiplexed signal M into a plurality of divided signals c1 (n divided signals c11, c12, . . . , and c1$n$) corresponding to the plurality of control signals a1 with BPFs. The divider 70 divides the multiplexed signal M into a plurality of divided signals c2 (n divided signals c21, c22, . . . , and c2$n$) corresponding to the plurality of read-aiding signals a2 with BPFs. The divider 70 divides the multiplexed signal M into a plurality of divided signals c3 (n divided signals c31, c32, . . . , and c3$n$) corresponding to the plurality of pump signals a3 with BPFs. In this manner, the divider 70 divides the multiplexed signal M into the plurality of types of divided signals c1, c2, and c3 corresponding to the plurality of types of signals generated by the generator 51.

The plurality of attenuators ATT attenuates the plurality of types of divided signals c1, c2, and c3 for use for the plurality of qubits q. Similarly to the first embodiment, the n ATTs 11, 12, . . . , and in attenuate the signal levels of the corresponding divided signals c11, c12, . . . , and c1$n$ among the plurality of divided signals c1 to level values used to control the states of the qubits q.

The n ATTs 21, 22, . . . , and 2$n$ attenuate the signal levels of the corresponding divided signals c21, c22, . . . , and c2$n$ among the plurality of divided signals c2 to level values used to read the states of the corresponding qubits among the plurality of qubits q. By supplying the attenuated divided signal c21 to the qubit q1 from the ATT 21, the state of the qubit q1 becomes readable. This similarly applies also to the divided signals c22, . . . , and c2$n$.

The n ATTs 31, 32, . . . , and 3$n$ attenuate the signal levels of the corresponding divided signals c31, c32, . . . , and c3$n$ among the plurality of divided signals c3 to level values used for amplification control for the corresponding amplifiers among the plurality of amplifiers p. By supplying the attenuated divided signal c31 to the amplifier p1 from the ATT 31, appropriate amplification of a read signal c41 representing a read result for the state of the qubit q1 may be enabled. This similarly applies also to the divided signals c32, . . . , and c3$n$.

The control device 300 includes the setter 56 that sends common setting signals s1, s2, and s3 set for each type of signals to the plurality of attenuators ATT for the purpose of setting each attenuation amount of the plurality of attenuators ATT. A power supply control unit 54 controls a programmable power supply 55 such that the common setting signals s1, s2, and s3 are sent to the plurality of attenuators ATT for each type of signals.

The setting signals s1 are commonly transmitted to the n ATTs 11, 12, . . . , and in from the setter 56 via a line 83. Each of the n ATTs 11, 12, . . . , and in attenuates the corresponding divided signal among the plurality of divided signals c1 by a same attenuation amount ΔL1 according to the setting value set by the setting signals s1. The setting signals s2 are commonly transmitted to the n ATTs 21, 22, . . . , and 2$n$ from the setter 56 via the line 83. Each of the n ATTs 21, 22, . . . , and 2$n$ attenuates the corresponding divided signal among the plurality of divided signals c2 by a same attenuation amount ΔL2 according to the setting value set by the setting signals s2. Each of the n ATTs 31, 32, . . . , and 3$n$ attenuates the corresponding divided signal among the plurality of divided signals c3 by a same attenuation amount ΔL3 according to the setting value set by the setting signals s3. In this manner, the setter 56 sends the common setting signals s1, s2, and s3 set for each type of signals to the plurality of attenuators ATT such that the same type of divided signals among the plurality of types of divided signals is attenuated with the same attenuation amount.

As illustrated in FIG. 4, in the second embodiment, the signal level of each of the plurality of types of analog signals b1, b2, and b3 is regulated to substantially the same level value L0 by the converter 52. By the common setting signals s1 for setting the value of the attenuation amount ΔL1, the signal level of each of the plurality of divided signals c1 is attenuated to the same level value used to control the states of the plurality of qubits q. By the common setting signals s2 for setting the value of the attenuation amount ΔL2, the signal level of each of the plurality of divided signals c2 is attenuated to the same level value used to control the states of the plurality of qubits q. By the common setting signals s3 for setting the value of the attenuation amount ΔL3, the signal level of each of the plurality of divided signals c3 is attenuated to the same level value used for amplification control for the plurality of amplifiers p. In this manner, separate setting of attenuation amounts for each type of signals may be enabled.

Accordingly, also in the second embodiment, the common setting signals s1, s2, and s3 are usable, similarly to the first embodiment. Consequently, the number of setting signals for setting each attenuation amount of the plurality of attenuators ATT may be reduced, which may in turn allow the number of lines 83 transmitting the setting signals s1, s2, and s3 and its arrangement space to be reduced.

In FIG. 3, for example, the setter 56 sets the common setting signals s1, s2, and s3 to the setting signals with which expected values are returned from some or all of the plurality of qubits q via a line 82. This may allow the setter 56 to set the common setting signals s1, s2, and s3 appropriate for attenuation of the plurality of divided signals c1, c2, and c3.

For example, the setter 56 sets the common setting signals s1 used to attenuate the plurality of divided signals c1 corresponding to the plurality of control signals a1, to the setting signals with which expected control results are returned from some or all of the plurality of qubits q via the line 82. This may allow the setter 56 to set the common setting signals s1 appropriate for attenuation of the plurality of divided signals c1.

For example, the setter 56 sets the common setting signals s2 used to attenuate the plurality of divided signals c2 corresponding to the plurality of read-aiding signals a2, to the setting signals with which expected responses are returned from some or all of the plurality of qubits q via the line 82. This may allow the setter 56 to set the common setting signals s2 appropriate for attenuation of the plurality of divided signals c2.

For example, the setter 56 sets the common setting signals s3 used to attenuate the plurality of divided signals c3 corresponding to the plurality of pump signals a3, to the setting signals with which expected output levels are returned from some or all of the amplifiers p of the plurality of qubits q via the line 82. This may allow the setter 56 to set the common setting signals s3 appropriate for attenuation of the plurality of divided signals c3.

In FIG. 3, the converter 52 may finely adjust, with the DACs, the signal levels of some analog signals among the plurality of analog signals of the same type of which signal levels are regulated. There may be a conceivable case where, with the common setting signals s1, no expected value is returned from some or all of the plurality of qubits q via the line 82, due to characteristic variations of the plurality of qubits q or the plurality of amplifiers p. Similarly, even with use of the setting signals s2 or the setting signals s3, there may be a conceivable case where no expected value is returned from some or all of the plurality of qubits q via the line 82. In such a case, the converter 52 may finely adjust, with the DACs, the signal levels of some analog signals among the plurality of analog signals of the same type of which signal levels are regulated, such that the expected values are returned from all of the plurality of qubits q.

Figure 5:
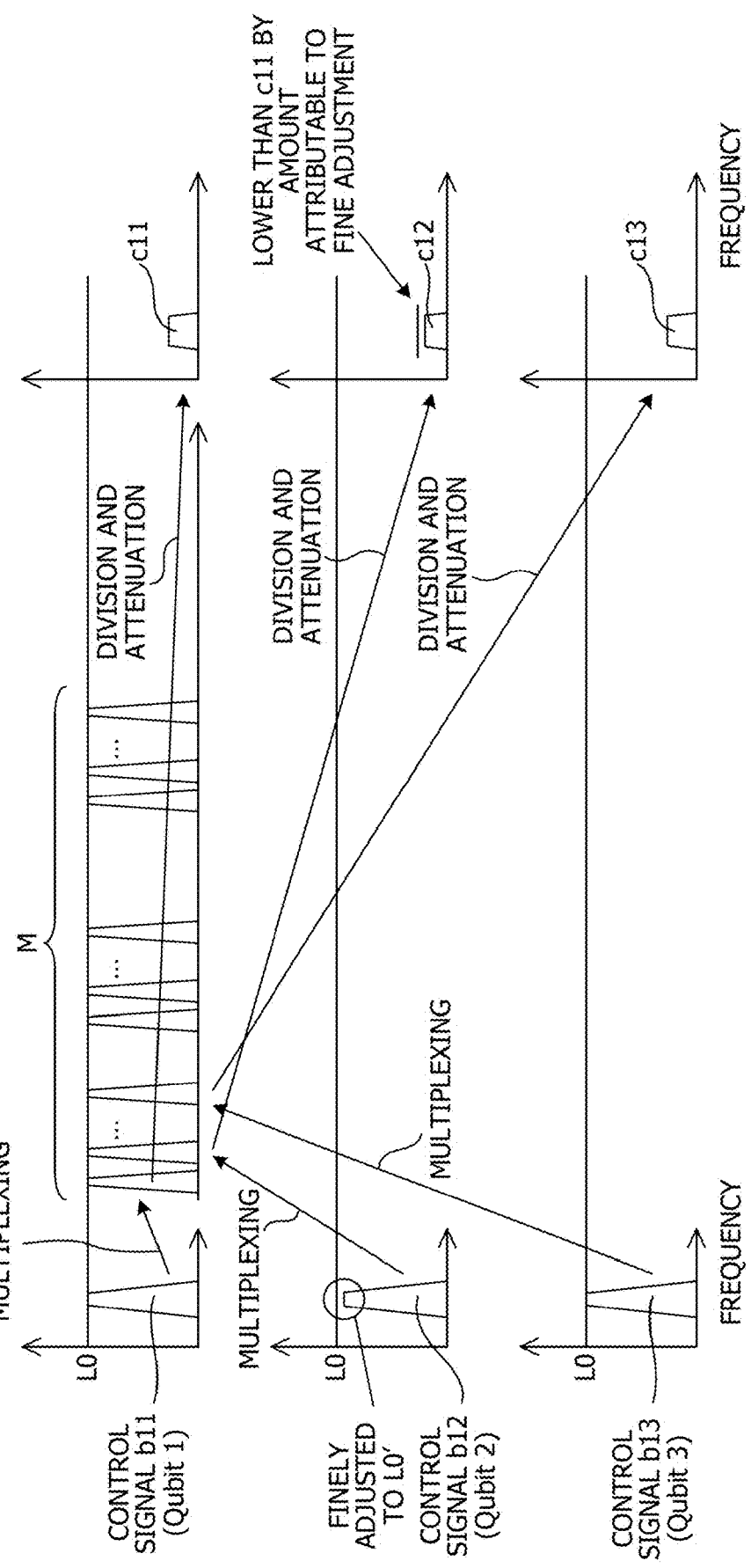
FIG. 5 is a diagram for explaining fine adjustment of signal levels of some analog signals among a plurality of analog signals of the same type of which signal levels are regulated.

FIG. 5 is a diagram for explaining fine adjustment of signal levels of some analog signals among a plurality of analog signals of the same type of which signal levels are regulated. Although FIG. 5 depicts a case of the control signals, the converter 52 may finely adjust the signal levels similarly also in a case of the read-aiding signals or the pump signals.

In a case where no expected value is returned from the qubit q2, the converter 52 finely adjust the signal level of the analog signal b12 corresponding to the control signal a12 for the qubit q2 to L0' from L0. L0' denotes a signal level at which the expected value is returned from the qubit q2. By finely adjusting the signal level of the analog signal b12 to L0' from L0, the signal level of the divided signal c12 output from the ATT 12 for the qubit q2 becomes lower than the signal level of the divided signal c11 output from the ATT 11 for the qubit q1 by an amount attributable to the fine adjustment. This ensures that the expected value is returned from the qubit q2.

Next, control methods executed by the information processing device according to each embodiment of the present disclosure will be described.

Figure 6:
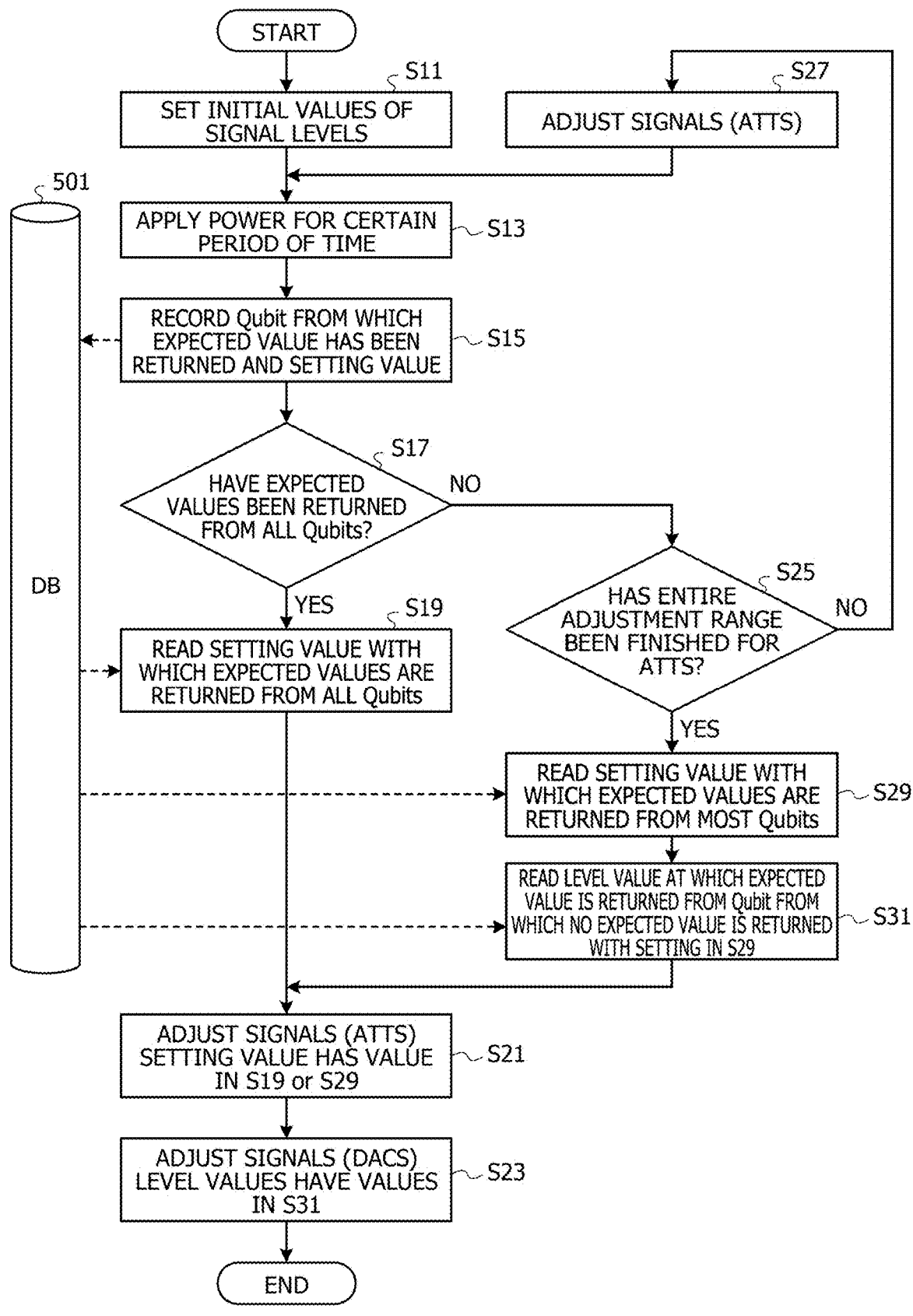
FIG. 6 is a flowchart illustrating a first example of a signal attenuation method executed by the information processing device of the present embodiment.
Figure 7:
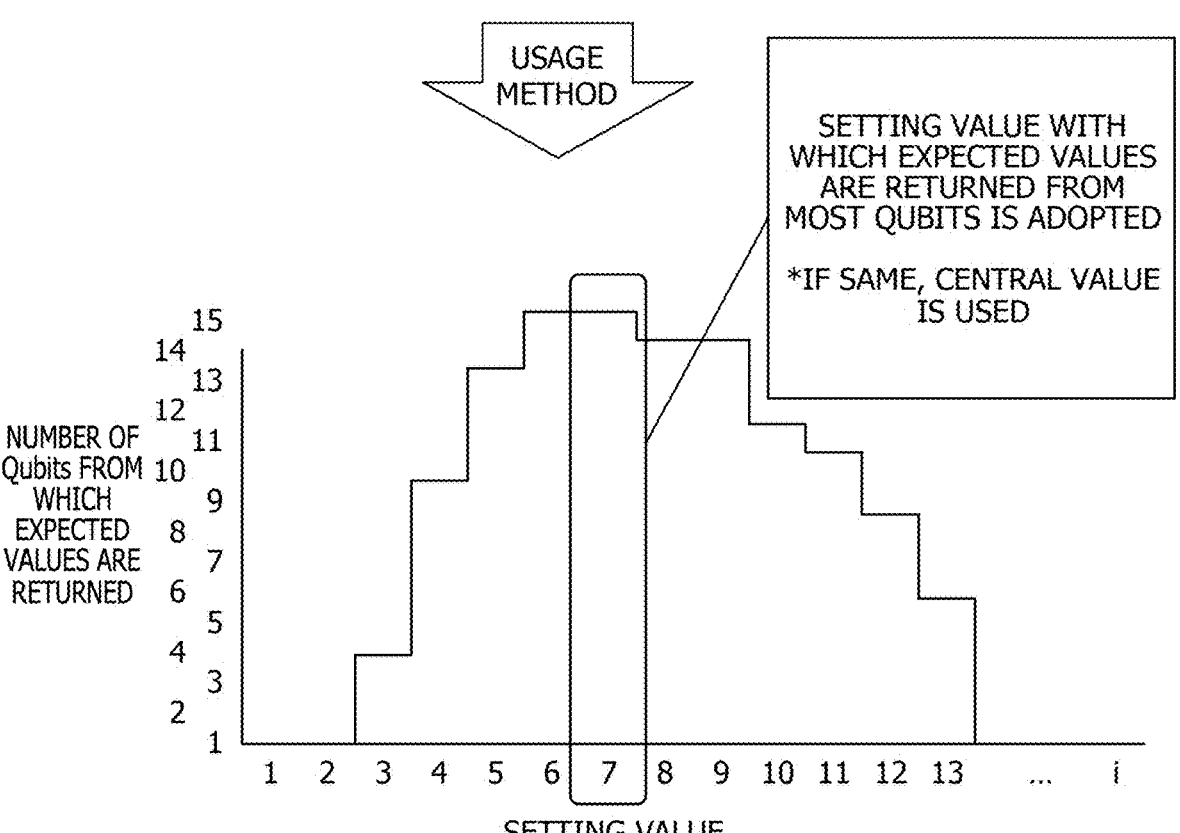
FIG. 7 is an explanatory diagram corresponding to the signal attenuation method in FIG. 6.

FIG. 6 is a flowchart illustrating a first example of a signal attenuation method executed by the information processing device of the present embodiment. The signal attenuation method in FIG. 6 is implemented by the control device 300 operating in accordance with the command cmd from the computer 500. FIG. 7 is an explanatory diagram corresponding to the signal attenuation method in FIG. 6. The signal attenuation method in FIG. 6 will be described with reference to FIG. 7.

The signal attenuation method in FIG. 6 is a method of deriving a setting value with which expected values are returned from the most qubits in calibration by variable ATTs and minimizing the number of signal level adjustments on the analog signals by the DACs. This may simplify adjustment of the signal levels of the analog signals by the DACs.

In step S11, the computer 500 sends the command cmd for causing the converter 52 to set initial values of the signal levels of the plurality of analog signals b1, b2, and b3 and causing the setter 56 to send the common setting signals s1, s2, and s3 for setting an initial value of the setting value.

In step S13, the multiplexed signal M obtained by multiplexing the plurality of analog signals b1, b2, and b3 is divided into the plurality of divided signals c1, c2, and c3. Then, in a state in which the setting value is set by the common setting signals, the attenuated divided signals c1 and c2 are supplied to the plurality of qubits p for a certain period of time, and the attenuated divided signals c3 are supplied to the plurality of amplifiers p for a certain period of time.

In step S15, the computer 500 records, in a database (DB 501), the setting value set by the setting signals and a qubit from which an expected value is returned with the setting value. The computer 500 may estimate, from the setting value, the level value of the analog signal at which an expected value is returned from a qubit from which no expected value is returned with the setting value and record the obtained estimated value in the DB 501.

In step S17, the computer 500 determines whether or not expected values have been returned from all the qubits p with the setting value set in immediately preceding step S13. In a case where it is determined that expected values have been returned from all the qubits p, the computer executes the process in step S19, and in a case where it is determined that expected values have not been returned from all the qubits p, the computer 500 executes the process in step S25.

In step S25, the computer 500 determines whether or not to have all finished changing the setting value set by the setting signals s1, s2, and s3 in a predetermined adjustment range 1 to i. In a case where the computer 500 has determined to have all finished changing the setting value set by the setting signals s1, s2, and s3 in the predetermined adjustment range 1 to i, the computer 500 executes the process in step S29. On the other hand, in a case where the computer 500 has determined to have not all finished changing the setting value set by the setting signals s1, s2, and s3 in the predetermined adjustment range 1 to i, the computer 500 executes the process in step S27.

In step S27, the computer 500 changes the setting value set by the setting signals s1, s2, and s3 to the next value. The computer 500 sends the command cmd for sending the setting signals s1, s2, and s3 for setting the setting value to the next value from the setter 56. The process in step S13 is executed with the setting value having the next value.

By repeating the processing loop of steps S13, S15, S17, S25, and S27, the DB 501 defining the relationship between a setting value and a qubit from which an expected value is returned with the setting value in the adjustment range 1 to i is created (see FIG. 7).

In step S19, the computer 500 reads, from the DB 501, a setting value with which expected values are returned from all the qubits q. In step S21, the computer 500 sends the command cmd for causing the setter 56 to send the setting signals s1, s2, and s3 for setting the setting value read in step S19. This allows the setter 56 to set the common setting signals s1, s2, and s3 to the setting signals specified using the DB 501, as signals with which expected values are returned from all of the plurality of qubits. At this time, since expected values are returned from all the qubits q, the process in step S23 is not executed.

On the other hand, in step S29, the computer 500 reads, from the DB 501, a setting value with which expected values are returned from the most qubits. In step S31, the computer 500 reads, from the DB 501, a level value at which an expected value is returned from a qubit from which no expected value is returned with the setting value in step S29.

In step S21 after the process in step S31, the computer 500 sends the command cmd for causing the setter 56 to send the setting signals s1, s2, and s3 for setting the setting value read in step S29. This allows the setter 56 to set the common setting signals s1, s2, and s3 to the setting signals specified using the DB 501, as signals with which expected values are returned from some of the plurality of qubits. Then, the setter 56 can set the common setting signals s1, s2, and s3 to the setting signals with which expected values are returned from the most qubits.

In step S23, the computer 500 sends the command cmd for causing the converter 52 to adjust the signal levels of the analog signals b1, b2, and b3 for a qubit from which no expected value is returned, to the level values read in step S31. This allows the converter 52 to adjust the signal level of an analog signal for a qubit from which no expected value is returned with the common setting signals, among the plurality of analog signals b1, b2, and b3, to the level value with which an expected value is returned from the qubit from which no expected value is returned with the common setting signals.

Figure 8:
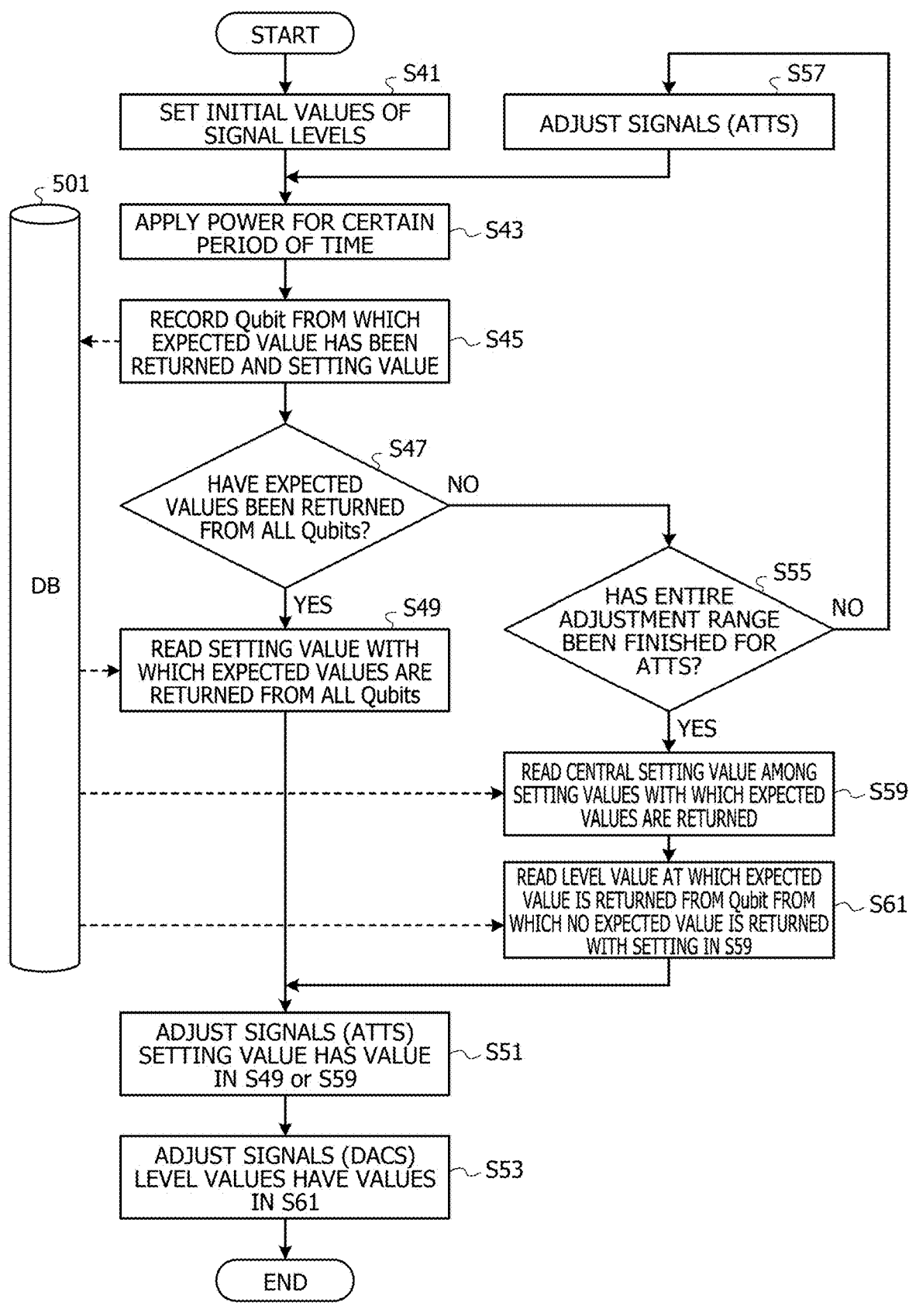
FIG. 8 is a flowchart illustrating a second example of the signal attenuation method executed by the information processing device of the present embodiment.
Figure 9:
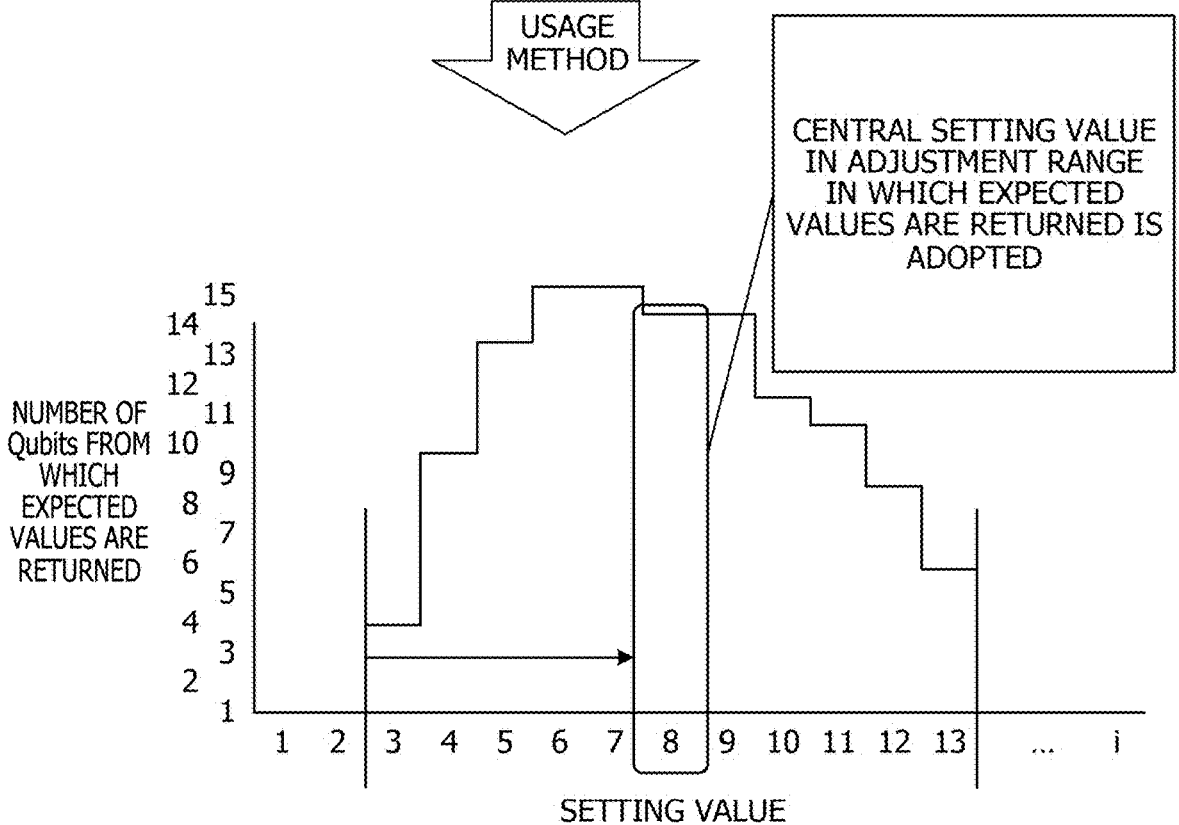
FIG. 9 is an explanatory diagram corresponding to the signal attenuation method in FIG. 8.

FIG. 8 is a flowchart illustrating a second example of the signal attenuation method executed by the information processing device of the present embodiment. The signal attenuation method in FIG. 8 is implemented by the control device 300 operating in accordance with the command cmd from the computer 500. FIG. 9 is an explanatory diagram corresponding to the signal attenuation method in FIG. 8. The signal attenuation method in FIG. 8 will be described with reference to FIG. 9.

The signal attenuation method in FIG. 8 is a method of deriving a central setting value among a plurality of setting values with which expected values are returned from some or all of the plurality of qubits q in calibration by variable ATTs and minimizing an adjustment margin for the signal levels of the analog signals by the DACs. This may secure the SN ratio of the attenuated divided signals.

The processing contents of steps S41 to S57 and S61 illustrated in FIG. 8 are the same as the processing contents of steps S11 to S27 and S31 illustrated in FIG. 6. The processing contents of step S59 illustrated in FIG. 8 is different from the processing contents of step S29 illustrated in FIG. 6.

In step S59, the computer 500 reads, from the DB 501, a central setting value among a plurality of setting values with which expected values are returned from some or all of the plurality of qubits q. In step S61, the computer 500 reads, from the DB 501, a level value at which an expected value is returned from a qubit from which no expected value is returned with the setting value in step S59.

In step S51 after the process in step S61, the computer 500 sends the command cmd for causing the setter 56 to send the setting signals s1, s2, and s3 for setting the setting value read in step S59. This allows the setter 56 to set the common setting signals s1, s2, and s3 to the setting signals specified using the DB 501, as signals with which expected values are returned from some of the plurality of qubits. Then, the setter 56 can set the common setting signals s1, s2, and s3 to the setting signals having the central setting value among the plurality of setting signals with which expected values are returned from some or all of the plurality of qubits q.

In step S53, the computer 500 sends the command cmd for causing the converter 52 to adjust the signal levels of the analog signals b1, b2, and b3 for a qubit from which no expected value is returned, to the level values read in step S61. This allows the converter 52 to adjust the signal level of an analog signal for a qubit from which no expected value is returned with the common setting signals, among the plurality of analog signals b1, b2, and b3, to the level value with which an expected value is returned from the qubit from which no expected value is returned with the common setting signals.

Figure 10:
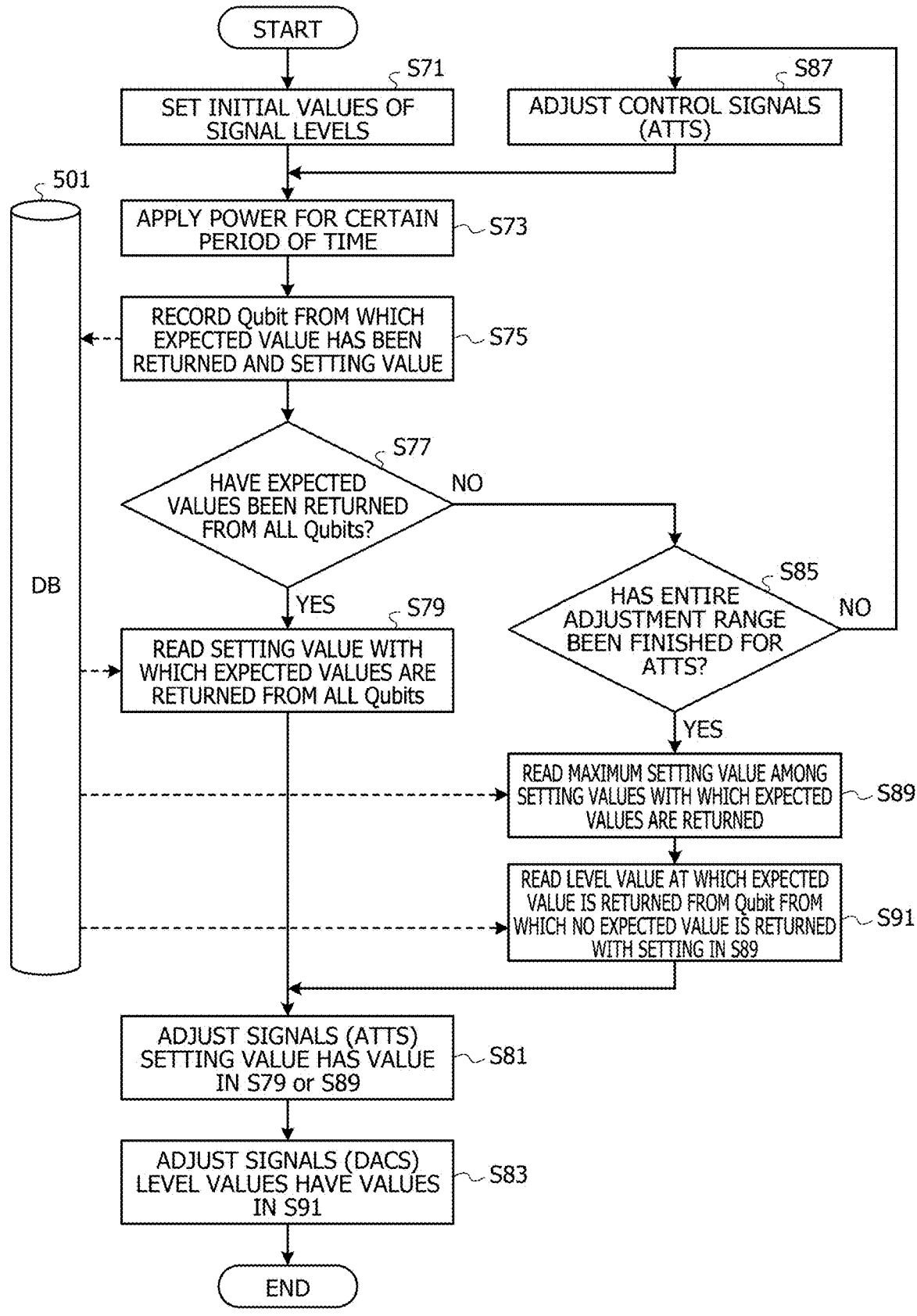
FIG. 10 is a flowchart illustrating a third example of the signal attenuation method executed by the information processing device of the present embodiment.
Figure 11:
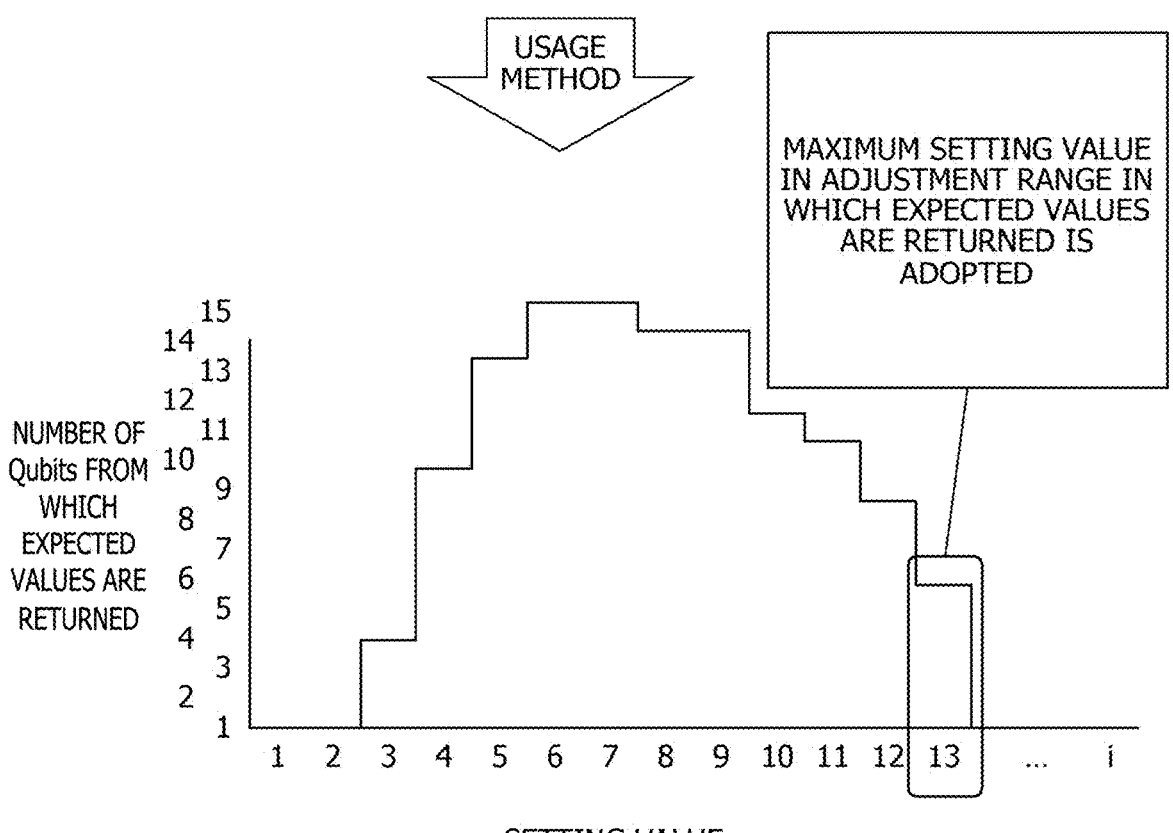
FIG. 11 is an explanatory diagram corresponding to the signal attenuation method in FIG. 10.

FIG. 10 is a flowchart illustrating a third example of the signal attenuation method executed by the information processing device of the present embodiment. The signal attenuation method in FIG. 10 is implemented by the control device 300 operating in accordance with the command cmd from the computer 500. FIG. 11 is an explanatory diagram corresponding to the signal attenuation method in FIG. 10. The signal attenuation method in FIG. 10 will be described with reference to FIG. 11.

The signal attenuation method in FIG. 10 is a method of deriving a maximum setting value among a plurality of setting values with which expected values are returned from some or all of a plurality of qubits q in calibration by variable ATTs and using DACs that adjust the signal levels of the analog signals in a full range. This may allow the dynamic range of the DACs to be effectively utilized.

The processing contents of steps S71 to S87 and S91 illustrated in FIG. 10 are the same as the processing contents of steps S11 to S27 and S31 illustrated in FIG. 6. The processing contents of step S89 illustrated in FIG. 10 is different from the processing content of step S29 illustrated in FIG. 6.

In step S89, the computer 500 reads, from the DB 501, a maximum setting value among a plurality of setting values with which expected values are returned from some or all of the plurality of qubits q. In step S91, the computer 500 reads, from the DB 501, a level value at which an expected value is returned from a qubit from which no expected value is returned with the setting value in step S89.

In step S81 after the process in step S91, the computer 500 sends the command cmd for causing the setter 56 to send the setting signals s1, s2, and s3 for setting the setting value read in step S89. This allows the setter 56 to set the common setting signals s1, s2, and s3 to the setting signals specified using the DB 501, as signals with which expected values are returned from some of the plurality of qubits. Then, the setter 56 can set the common setting signals s1, s2, and s3 to the setting signals having the maximum setting value among the plurality of setting signals with which expected values are returned from some or all of the plurality of qubits q.

In step S83, the computer 500 sends the command cmd for causing the converter 52 to adjust the signal levels of the analog signals b1, b2, and b3 for a qubit from which no expected value is returned, to the level values read in step S91. This allows the converter 52 to adjust the signal level of an analog signal for a qubit from which no expected value is returned with the common setting signals, among the plurality of analog signals b1, b2, and b3, to the level value with which an expected value is returned from the qubit from which no expected value is returned with the common setting signals.

Figure 12:
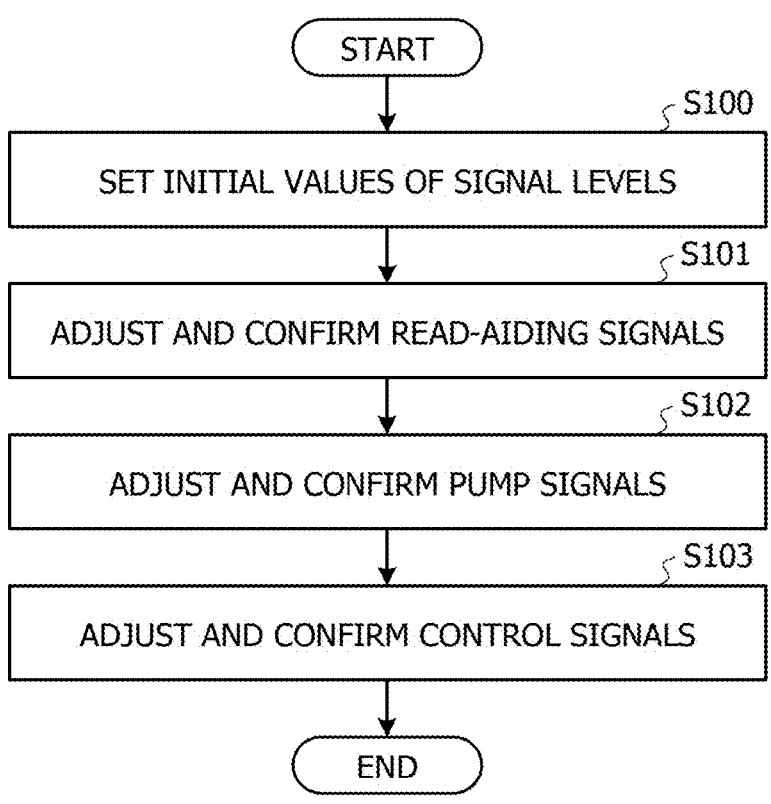
FIG. 12 is a flowchart depicting an overall flow of the signal attenuation method executed by the information processing device of the present embodiment.

FIG. 12 is a flowchart depicting an overall flow of the signal attenuation method executed by the information processing device of the present embodiment. The signal attenuation method in FIG. 12 is implemented by the control device 300 operating in accordance with the command cmd from the computer 500. By executing the processes in each step in the order illustrated in FIG. 12, adjustment and confirmation of each signal may be efficiently carried out.

In step S100, the computer 500 sends the command cmd for causing the converter 52 to set initial values of the signal levels of the plurality of analog signals b1, b2, and b3 and causing the setter 56 to send the common setting signals s1, s2, and s3 for setting an initial value of the setting value.

In step S101, the computer 500 sends the command cmd for adjusting and confirming the plurality of read-aiding signals a2 (n read-aiding signals a21, a22, . . . , and a2n). This causes the setter 56 to adjust the common setting signals s2 relating to the read-aiding signals a2, to setting signals with which expected responses are returned from some or all of the plurality of qubits q. In step S101, the setter 56 executes the signal attenuation method in FIG. 6, 8, or 10 for the read-aiding signals a2, for example.

In step S102, the computer 500 sends the command cmd for adjusting and confirming the plurality of pump signals a3 (n pump signals a31, a32, . . . , and a3n). This causes the setter 56 to adjust the common setting signals s3 relating to the pump signals a3, to setting signals with which expected output levels are returned from some or all of the amplifiers p of the plurality of qubits q. In step S102, the setter 56 executes the signal attenuation method in FIG. 6, 8, or 10 for the pump signals a3, for example.

In step S103, the computer 500 sends the command cmd for adjusting and confirming the plurality of control signals a1 (n control signals a11, a12, . . . , and a1n). This causes the setter 56 to adjust the common setting signals s1 relating to the control signals a1, to setting signals with which expected control results are returned from some or all of the plurality of qubits q. In step S103, the setter 56 executes the signal attenuation method in FIG. 6, 8, or 10 for the control signals a1, for example.

Figure 13:
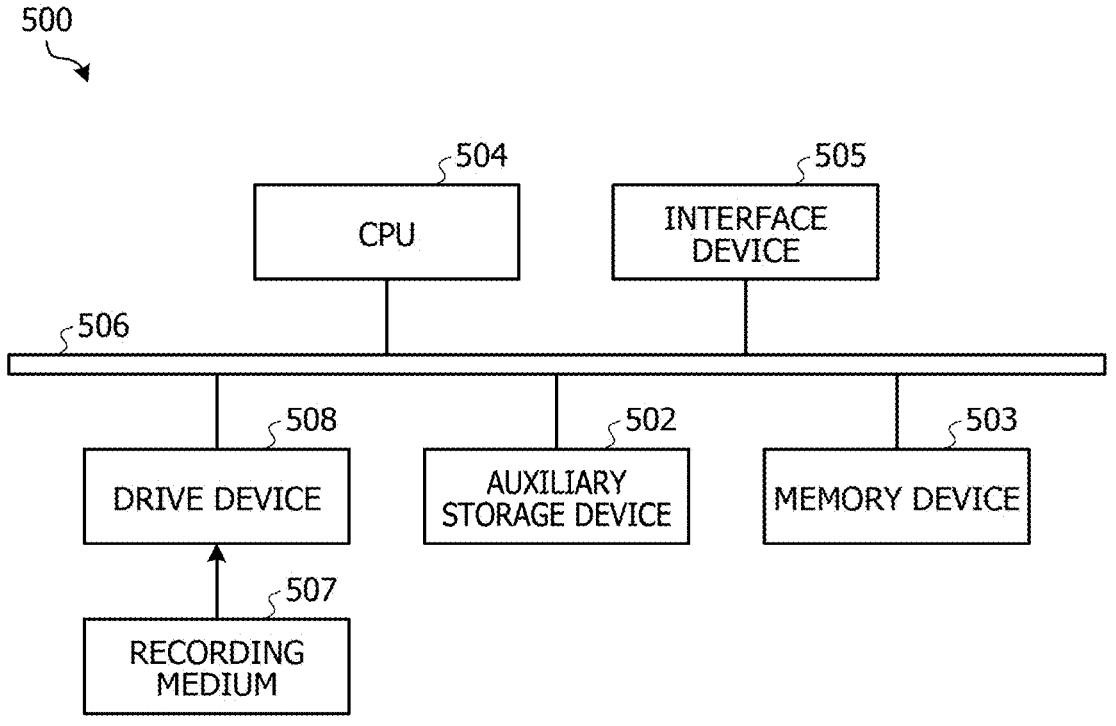
FIG. 13 is a hardware configuration diagram of a computer.

FIG. 13 is a hardware configuration diagram of a computer. The computer 500 includes a drive device 508, an auxiliary storage device 502, a memory device 503, a central processing unit (CPU) 504, and an interface device 505, and the like that are mutually coupled to each other by a bus 506.

A program that implements processing in the computer 500 is provided by a recording medium 507. When the recording medium 507 recording the program is set in the drive device 508, the program is installed in the auxiliary storage device 502 from the recording medium 507 via the drive device 508. However, the program does not necessarily have to be installed from the recording medium 507 and may be downloaded from another computer via a network. The auxiliary storage device 502 stores the installed program and also stores files, data, and the like that are needed.

The memory device 503 reads the program from the auxiliary storage device 502 and stores the read program when an instruction to start the program is issued. The CPU 504 is a processor that executes functions related to the computer 500 in accordance with the program stored in the memory device 503. The interface device 505 is used as an interface for coupling to the outside.

Note that examples of the recording medium 507 include a portable recording medium such as a compact disc read only memory (CD-ROM), a digital versatile disc (DVD) disk, or a universal serial bus (USB) memory. In addition, examples of the auxiliary storage device 502 include a hard disk drive (HDD), a flash memory, and the like. Both of the recording medium 507 and the auxiliary storage device 502 correspond to a computer-readable recording medium.

A program for causing the computer 500 to execute each process illustrated in FIGS. 6, 8, and 10 may be stored in the auxiliary storage device 502. The DB 501 may be stored in the auxiliary storage device 502 or the memory device 503.

While the embodiments have been described above, the embodiments described above are presented as examples, and the present invention is not limited by the above embodiments. The embodiments described above can be carried out in various other forms, and various types of combinations, omissions, substitutions, alterations, and the like can be made without departing from the gist of the invention. Those embodiments and modifications thereof are included in the scope and gist of the invention and are also included in the inventions described in the claims and the equivalent scope thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:

a plurality of qubits;

a generator configured to generate a plurality of signals;

a converter configured to convert the plurality of signals into a plurality of analog signals of which signal levels are regulated;

a multiplexer configured to output a multiplexed signal obtained by multiplexing the plurality of analog signals;

a divider configured to divide the multiplexed signal into a plurality of divided signals;

a plurality of attenuators configured to attenuate the plurality of divided signals and provides the plurality of attenuated divided signals to each of the plurality of qubits; and a setter configured to send setting signals that are common to the plurality of attenuators and indicate each of attenuation amounts of the plurality of attenuators, wherein the attenuation amounts are set in the plurality of attenuators, based on the setting signals.

2. The information processing device according to claim 1, wherein the setter sets the setting signals that are common to the plurality of attenuators, to the setting signals with which expected values are returned from some or all of the plurality of qubits.

3. The information processing device according to claim 2, wherein the setter changes the setting signals that are common to the plurality of attenuators and are to be sent to the plurality of attenuators, and sets the setting signals that are common to the plurality of attenuators, to the setting signals with which the expected values are returned from some or all of the plurality of qubits.

4. The information processing device according to claim 3, comprising a computer that changes the setting signals that are common to the plurality of attenuators and are to be sent to the plurality of attenuators from the setter, and records, in a database, the setting signals and the qubits from which the expected values are returned with the setting signals, wherein the setter sets the setting signals common to the plurality of attenuators, to the setting signals specified by using the database, as signals with which the expected values are returned from some or all of the plurality of qubits.

5. The information processing device according to claim 2, wherein the setter sets the setting signals that are common to the plurality of attenuators, to the setting signals with which the expected values are returned from the most qubits.

6. The information processing device according to claim 2, wherein the setter sets the setting signals that are common to the plurality of attenuators, to the setting signals that have a central setting value among a plurality of the setting signals with which the expected values are returned from some or all of the plurality of qubits.

7. The information processing device according to claim 2, wherein the setter sets the setting signals that are common to the plurality of attenuators, to the setting signals that have a maximum setting value among a plurality of the setting signals with which the expected values are returned from some or all of the plurality of qubits.

8. The information processing device according to claim 1, wherein in a case where it is determined that there are the qubits from which no expected values are returned with the setting signals that are common to the plurality of attenuators, the converter adjusts signal levels of the analog signals for the qubits from which no expected values are returned with the setting signals that are common to the plurality of attenuators, among the plurality of analog signals, to level values at which the expected values are returned from the qubits from which no expected values are returned with the setting signals that are common to the plurality of attenuators.

9. The information processing device according to claim 1, wherein the plurality of signals includes a plurality of types of the signals, the converter converts the plurality of types of the signals into the plurality of analog signals of which signal levels are regulated, the plurality of divided signals includes the plurality of types of the divided signals that correspond to the plurality of types of the signals, and the setter sends the setting signals that are common to the plurality of attenuators, to the plurality of attenuators such that divided signals of a same type among the plurality of types of the divided signals are attenuated by a same attenuation amount.

10. The information processing device according to claim 9, wherein the plurality of types of the signals includes control signals for the qubits, read-aiding signals for the qubits, and pump signals for amplifiers for the qubits.

11. The information processing device according to claim 10, wherein the setter:

adjusts the setting signals that are common to the plurality of attenuators and relate to the read-aiding signals, to the setting signals with which expected responses are returned from some or all of the plurality of qubits; subsequently, adjusts the setting signals that are common to the plurality of attenuators and relate to the pump signals, to the setting signals with which expected output levels are returned from some or all of the amplifiers of the plurality of qubits; and subsequently, adjusts the setting signals that are common to the plurality of attenuators and relate to the control signals, to the setting signals with which expected control results are returned from some or all of the plurality of qubits.

12. The information processing device according to claim 2, wherein the plurality of signals includes a plurality of control signals for the qubits, and the setter sets the setting signals that are common to the plurality of attenuators and are used to attenuate the plurality of divided signals that corresponds to the plurality of control signals, to the setting signals with which expected control results are returned from some or all of the plurality of qubits.

13. The information processing device according to claim 2, wherein the plurality of signals includes a plurality of read-aiding signals for the qubits, and the setter sets the setting signals that are common to the plurality of attenuators and are used to attenuate the plurality of divided signals that corresponds to the plurality of read-aiding signals, to the setting signals with which expected responses are returned from some or all of the plurality of qubits.

14. The information processing device according to claim 2, wherein the plurality of signals includes a plurality of pump signals configured to control amplifiers for the qubits, and the setter sets the setting signals that are common to the plurality of attenuators and are used to attenuate the plurality of divided signals that corresponds to the plurality of pump signals, to the setting signals with which expected output levels are returned from some or all of the amplifiers of the plurality of qubits.

15. The information processing device according to claim 1, comprising: a cooler that includes a plurality of rooms placed in line such that a temperature gradually decreases;

a line that extends from a highest temperature room to a lowest temperature room among the plurality of rooms and transmits the multiplexed signal to the divider, wherein the lowest temperature room accommodates the plurality of qubits, the divider, and the plurality of attenuators.

16. A method comprising:

generating, by a generator, a plurality of signals for use for a plurality of qubits;

regulating, by a converter, levels of the plurality of signals;

outputting, by a multiplexer, a multiplexed signal obtained by multiplexing the plurality of signals of which the levels are regulated by the converter;

dividing, by a divider, the multiplexed signal into a plurality of divided signals that corresponds to the plurality of signals;

attenuating, by a plurality of attenuators, the plurality of divided signals for use for the plurality of qubits; and sending, by a setter, setting signals that are common to the plurality of attenuators, to the plurality of attenuators for a purpose of setting each of attenuation amounts of the plurality of attenuators.

17. A non-transitory computer-readable recording medium storing a program for causing a computer to perform processing comprising:

generating, by a generator, a plurality of signals for use for a plurality of qubits;

regulating, by a converter, levels of the plurality of signals;

outputting, by a multiplexer, a multiplexed signal obtained by multiplexing the plurality of signals of which the levels are regulated by the converter;

dividing, by a divider, the multiplexed signal into a plurality of divided signals that corresponds to the plurality of signals;

attenuating, by a plurality of attenuators, the plurality of divided signals for use for the plurality of qubits; and sending, by a setter, setting signals that are common to the plurality of attenuators, to the plurality of attenuators for a purpose of setting each of attenuation amounts of the plurality of attenuators.

\* \* \* \* \*